US012582185B1

(12) United States Patent
Issa

(10) Patent No.: US 12,582,185 B1
(45) Date of Patent: Mar. 24, 2026

(54) GLUE-APPLICATING APPARATUS FOR HAIR TRACKS

(71) Applicant: Hasan Issa, Noblesville, IN (US)

(72) Inventor: Hasan Issa, Noblesville, IN (US)

( * ) Notice: Subject to any disclaimer, the term of this patent is extended or adjusted under 35 U.S.C. 154(b) by 732 days.

(21) Appl. No.: 17/972,700

(22) Filed: Oct. 25, 2022

(51) Int. Cl.
*A41G 5/00* (2006.01)
*B05C 1/00* (2006.01)

(52) U.S. Cl.
CPC ............ *A41G 5/0086* (2013.01); *B05C 1/006* (2013.01)

(58) Field of Classification Search
None
See application file for complete search history.

(56) References Cited

U.S. PATENT DOCUMENTS 2,022,777 A * 12/1935 Mackenzie .......... A43D 25/181 401/149
3,288,108 A * 11/1966 Hildebrandt .............. B05C 1/08 118/258
4,316,755 A * 2/1982 Flaum ................... B05C 1/0813 118/259
5,352,322 A * 10/1994 Leverick ............... B05C 1/0813 118/244
5,443,639 A * 8/1995 Hawkes ................ B05C 1/0813 118/712
5,921,253 A 7/1999 Jeong
8,962,074 B2 2/2015 Hafner
10,561,185 B2 2/2020 Harris
10,779,595 B1 9/2020 Hurst
10,953,426 B2 3/2021 Cerciello
2011/0014012 A1 1/2011 Muller-Lorenschat
2015/0037121 A1 * 2/2015 Huotari ................... B05C 1/006 412/37

FOREIGN PATENT DOCUMENTS

WO 2017195011 11/2017

* cited by examiner

*Primary Examiner* — Binu Thomas
(74) *Attorney, Agent, or Firm* — Kyle A. Fletcher, Esq.

(57) ABSTRACT

The glue-applicating apparatus for hair tracks is configured for use with a hair track. The hair track is an example of a hair extension. The glue-applicating apparatus for hair tracks applies an adhesive to the hair extension. The adhesive adheres the hair extension to the skin of a client. The glue-applicating apparatus for hair tracks comprises a housing structure, a fluidic structure, and an application structure. The housing structure contains the fluidic structure and the application structure. The application structure forms a fluidic connection with the fluidic structure. The fluidic connection transports the adhesive to the application structure. The application structure applies the adhesive to the hair extension.

9 Claims, 6 Drawing Sheets

GLUE-APPLICATING APPARATUS FOR HAIR TRACKS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of tools for applying hair extensions. (A41G5/0086)

SUMMARY OF INVENTION

The glue-applicating apparatus for hair tracks is configured for use with a hair track. The hair track is an example of a hair extension. The glue-applicating apparatus for hair tracks applies an adhesive to the hair extension. The adhesive adheres the hair extension to the skin of a client. The glue-applicating apparatus for hair tracks comprises a housing structure, a fluidic structure, and an application structure. The housing structure contains the fluidic structure and the application structure. The application structure forms a fluidic connection with the fluidic structure. The fluidic connection transports the adhesive to the application structure. The application structure applies the adhesive to the hair extension.

These together with additional objects, features and advantages of the glue-applicating apparatus for hair tracks will be readily apparent to those of ordinary skill in the art upon reading the following detailed description of the presently preferred, but nonetheless illustrative, embodiments when taken in conjunction with the accompanying drawings.

In this respect, before explaining the current embodiments of the glue-applicating apparatus for hair tracks in detail, it is to be understood that the glue-applicating apparatus for hair tracks is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the glue-applicating apparatus for hair tracks.

It is therefore important that the claims be regarded as including such equivalent construction insofar as they do not depart from the spirit and scope of the glue-applicating apparatus for hair tracks. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
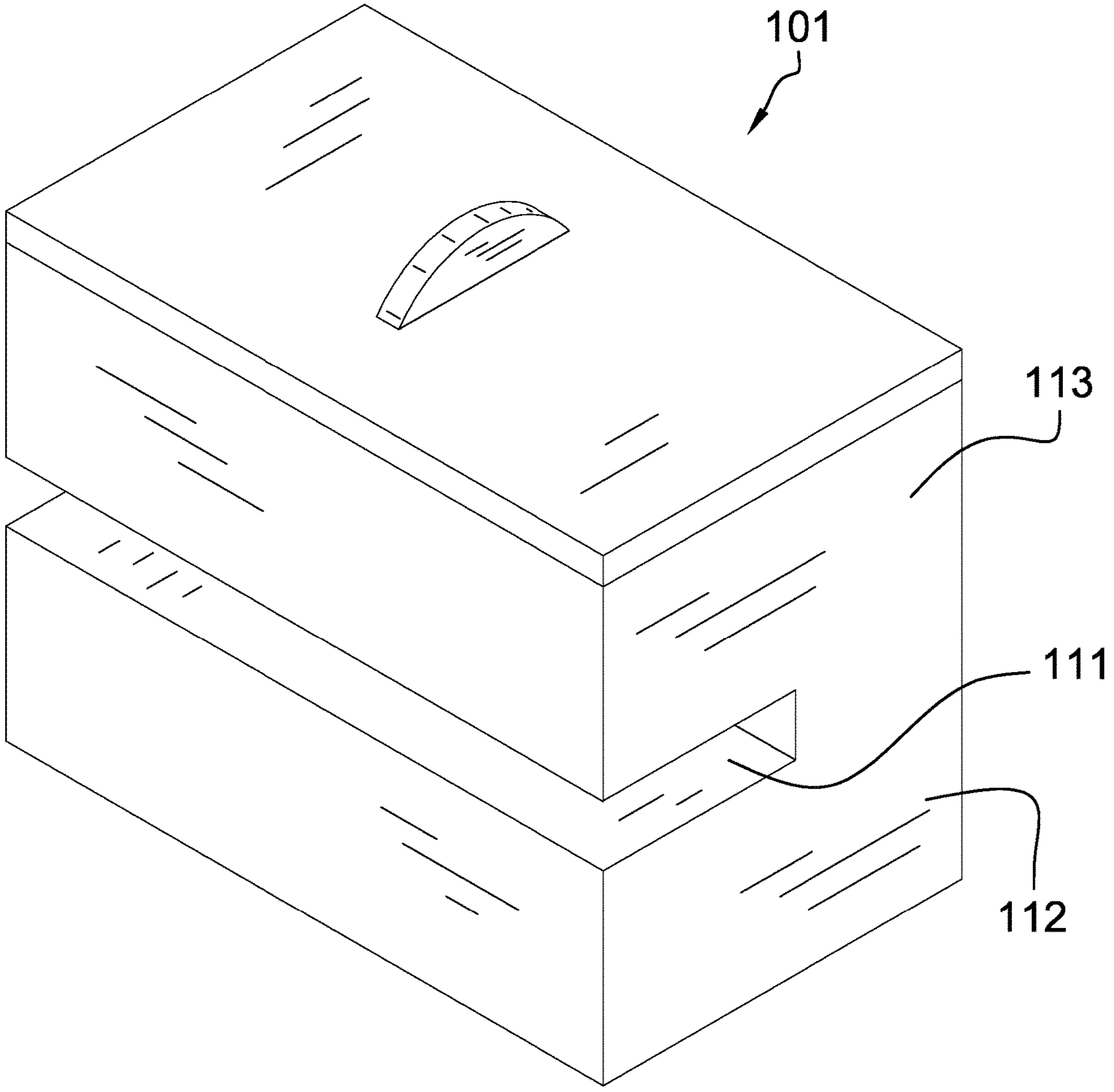
FIG. 1 is a perspective view of an embodiment of the disclosure.
Figure 2:
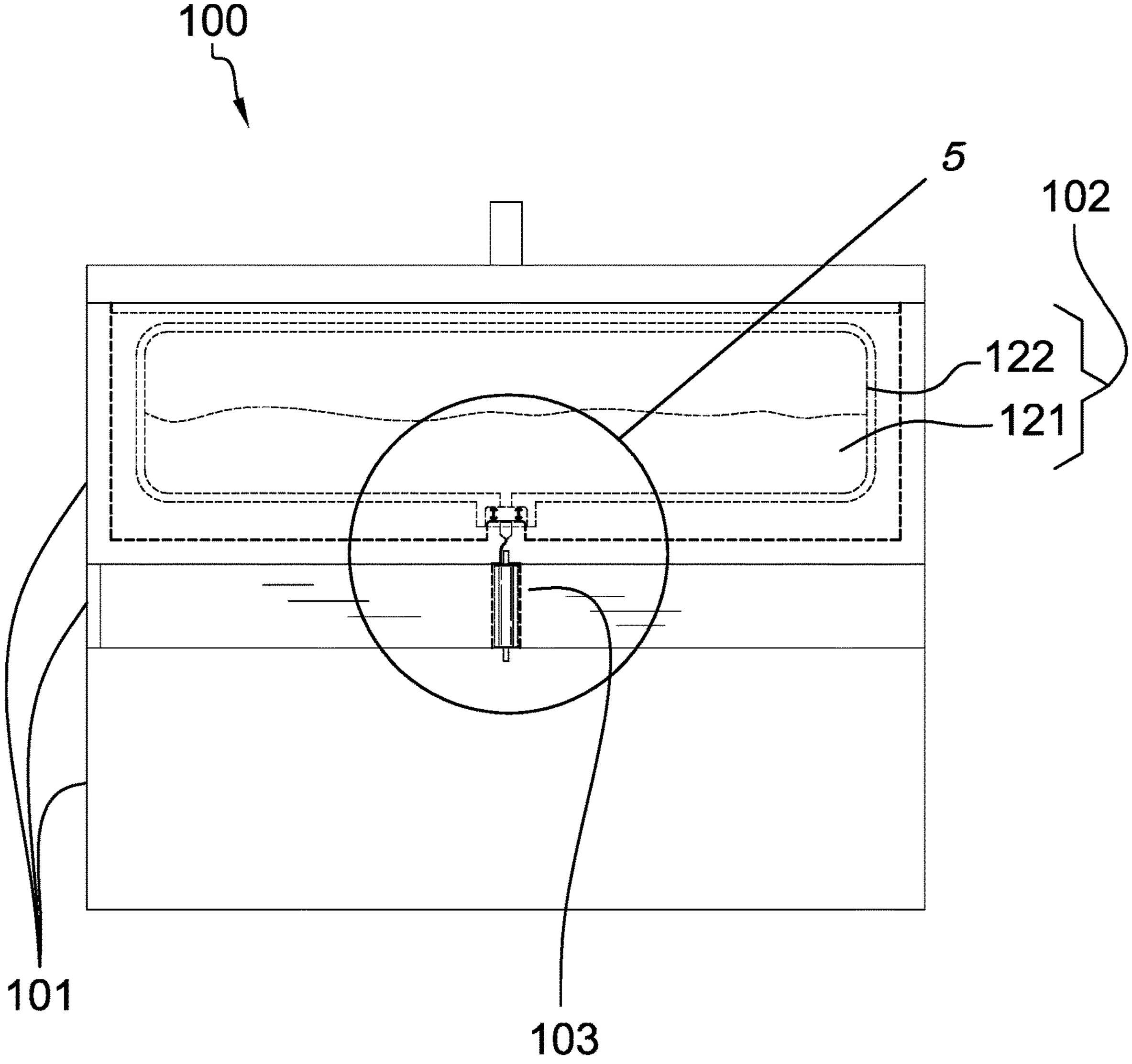
FIG. 2 is a front view of an embodiment of the disclosure.
Figure 3:
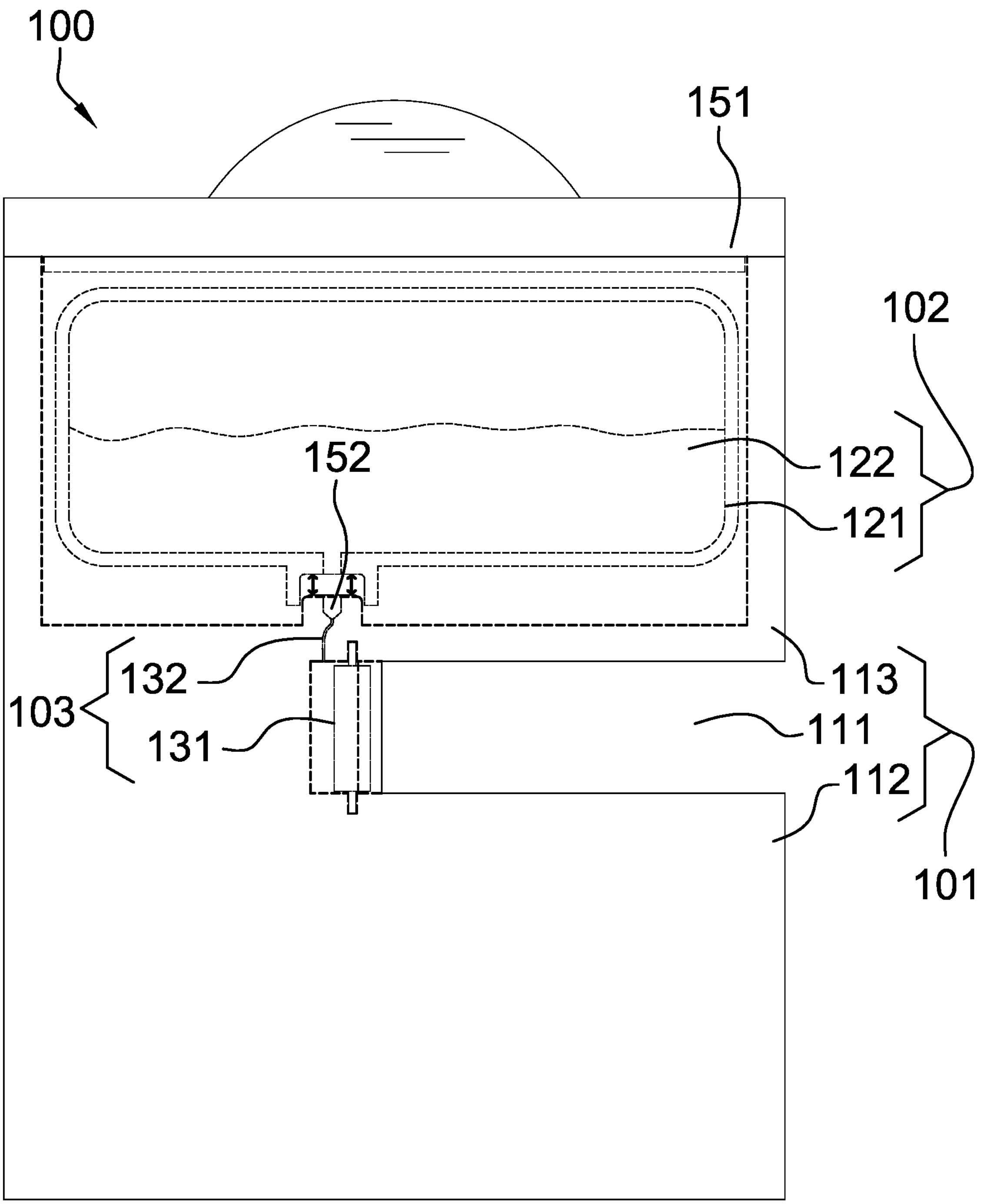
FIG. 3 is a side view of an embodiment of the disclosure.
Figure 4:
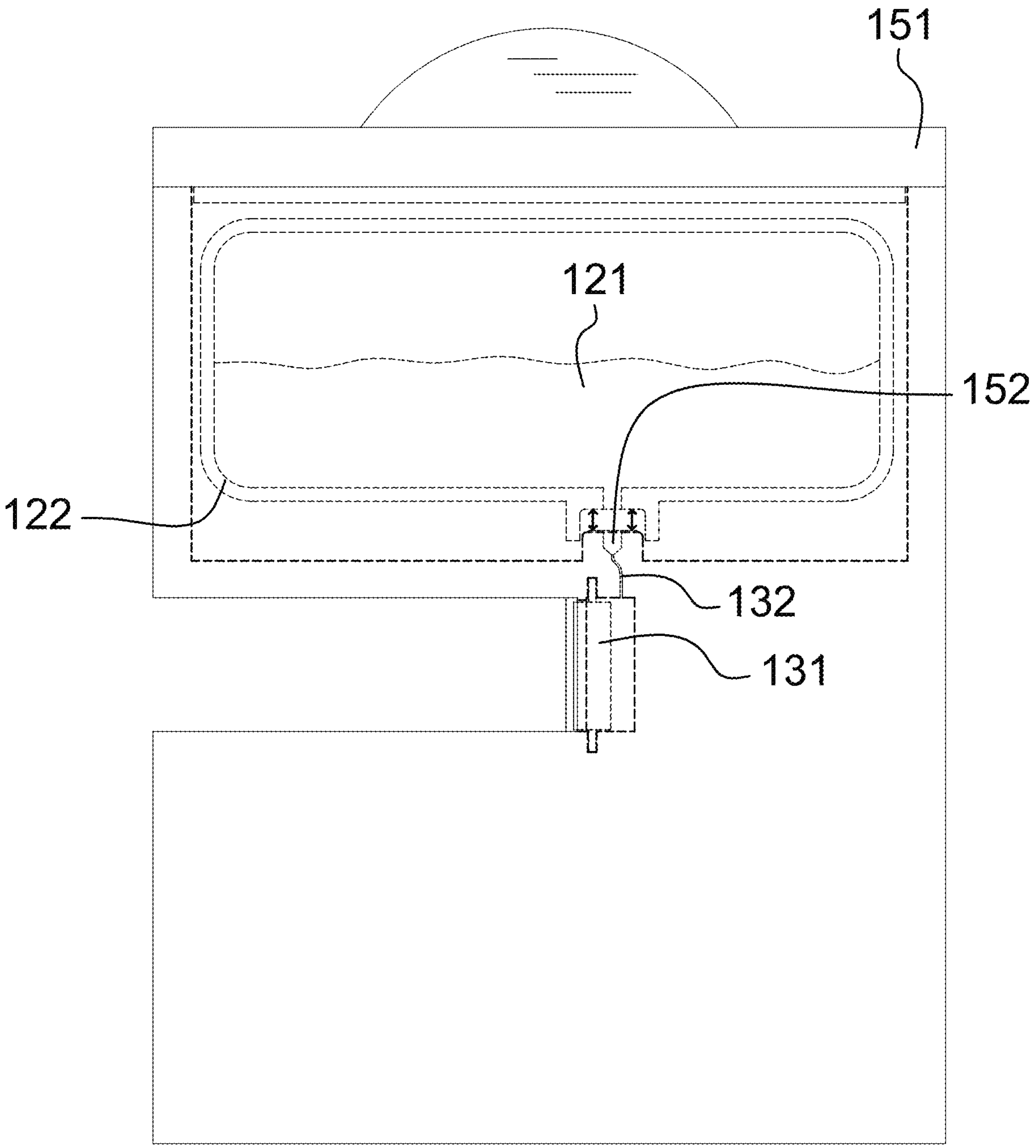
FIG. 4 is a reverse side view of an embodiment of the disclosure.
Figure 5:
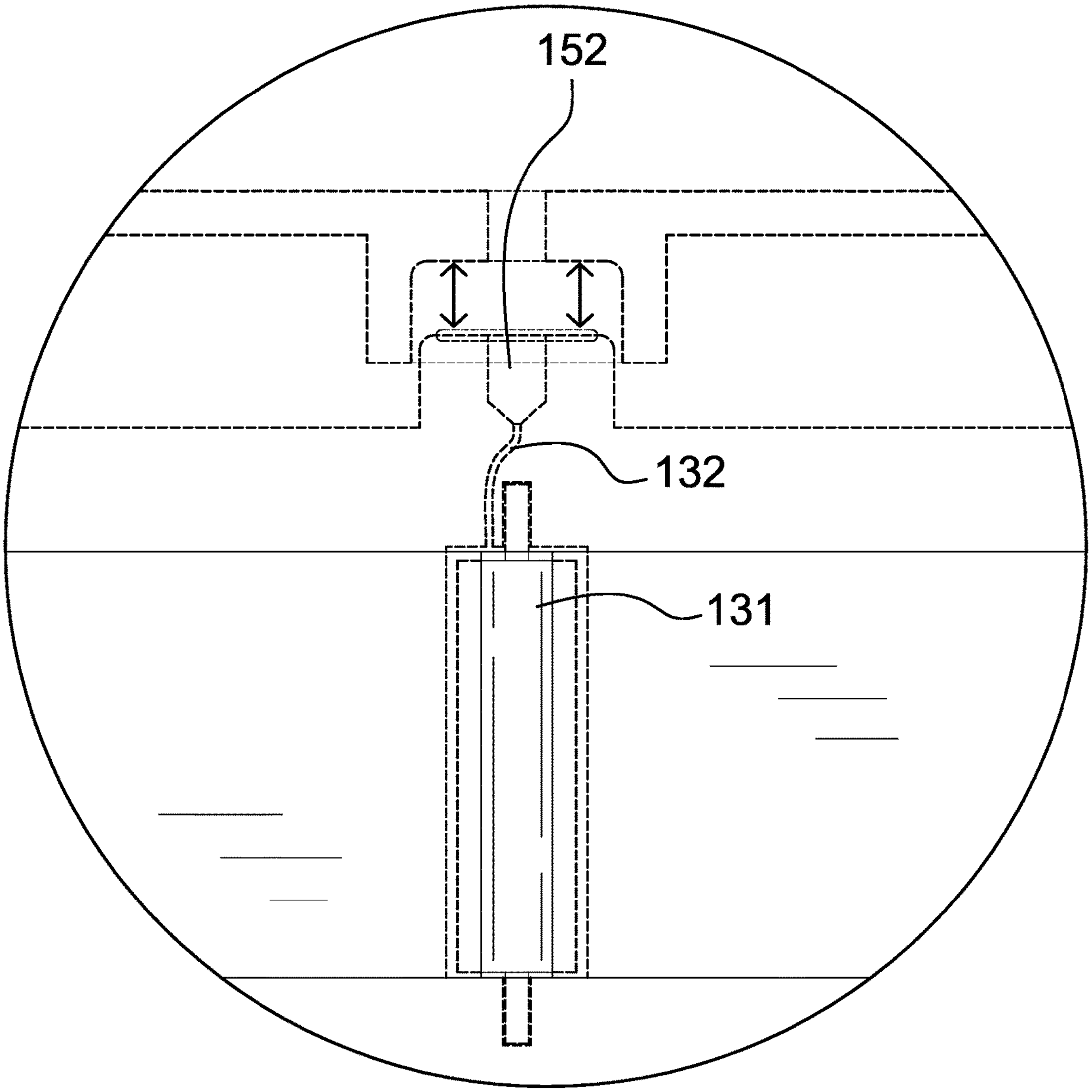
FIG. 5 is a detail view of an embodiment of the disclosure.
Figure 6:
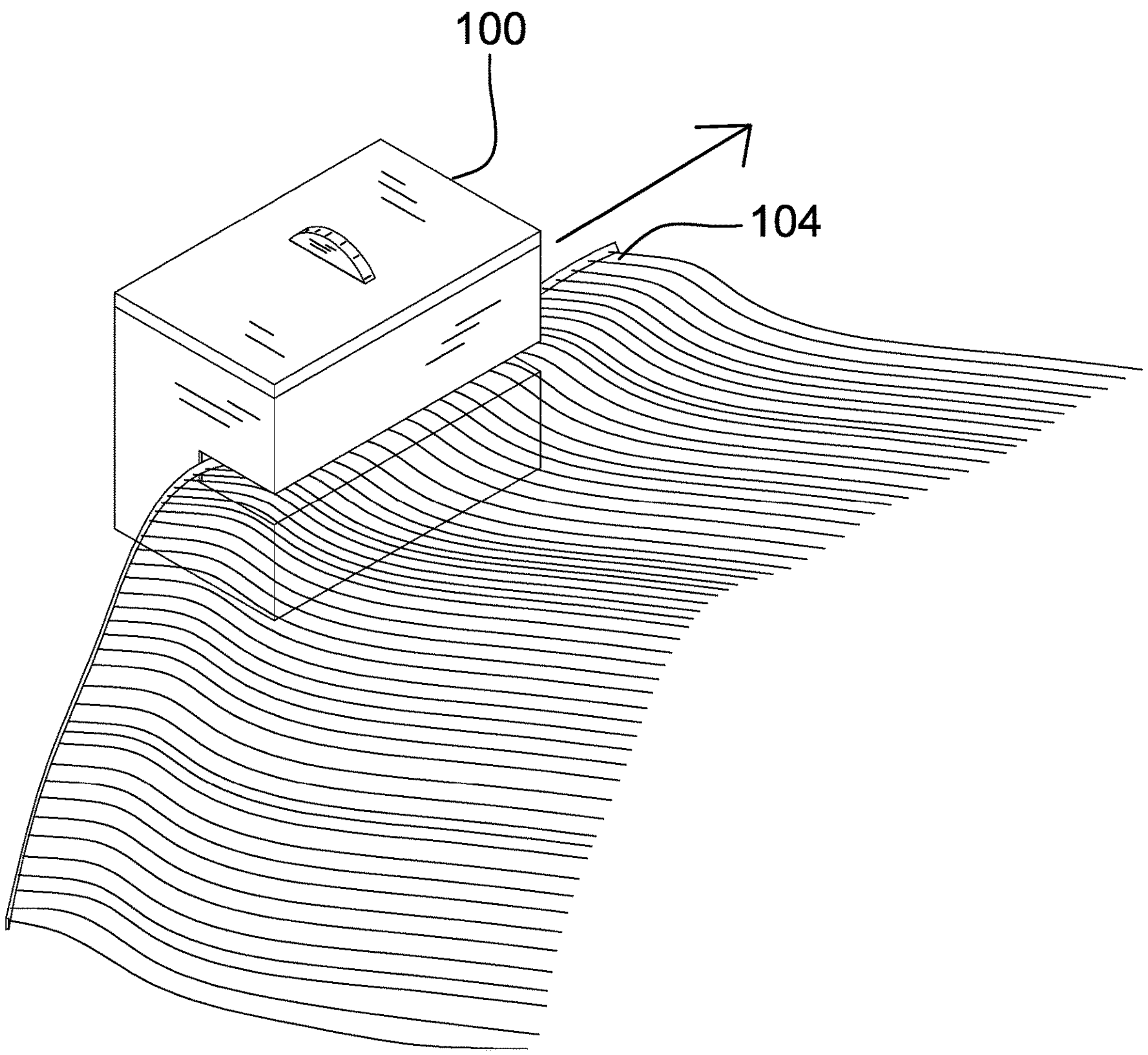
FIG. 6 is an in-use view of an embodiment of the disclosure.

Detailed reference will now be made to one or more potential embodiments of the disclosure, which are illustrated in FIGS. 1 through 6.

The glue-applicating apparatus for hair tracks 100 (hereinafter invention) is configured for use with a hair track. The hair track is an example of a hair extension 104. The invention 100 applies an adhesive to the hair extension 104. The adhesive adheres the hair extension 104 to the skin of a client. The invention 100 comprises a housing structure 101, a fluidic structure 102, and an application structure 103. The housing structure 101 contains the fluidic structure 102 and the application structure 103. The application structure 103 forms a fluidic connection 132 with the fluidic structure 102. The fluidic connection 132 transports the adhesive to the application structure 103. The application structure 103 applies the adhesive to the hair extension 104.

The housing structure 101 is a rigid structure. The housing structure 101 has the primary shape of a prism. The housing structure 101 contains the fluidic structure 102 and the application structure 102. The housing structure 101 is formed with all apertures and form factors necessary to allow the housing structure 101 to accommodate the use and operation of the fluidic structure 102 and the application structure 102. The housing structure 101 comprises a u-shaped slot 111, a pedestal structure 112, and the reservoir housing 113.

The u-shaped slot 111 is a negative space that is formed in the housing structure 101. The u-shaped slot 111 is a disk shaped negative space. The u-shaped slot 111 has a u-shape. The u-shaped slot 111 is formed with three open lateral faces. The hair extension 104 is exposed to the application structure 103 as it is drawn through the u-shaped slot 111.

The position of the u-shaped slot 111 is between the pedestal structure 112 and the reservoir housing 113.

The pedestal structure 112 is a prism shaped structure. The pedestal structure 112 forms the inferior structure of the housing structure 101. The pedestal structure 112 is a load bearing structure. The pedestal structure 112 transfers the load of the invention 100 to a supporting surface.

The reservoir housing 113 is a prism shaped structure. The reservoir housing 113 is a hollow structure. The reservoir housing 113 forms the superior structure of the housing structure 101. The reservoir housing 113 forms a protected space that contains the fluidic structure 102.

The reservoir housing 113 is a rigid structure. The reservoir housing 113 is a prism shaped structure. The reservoir housing 113 is a hollow structure. The reservoir housing 113 contains the fluidic structure 102. The reservoir housing 113 is formed with all apertures and form factors necessary to allow the reservoir housing 113 to accommodate the use and operation of the fluidic structure 102.

The fluidic structure 102 is a containment structure. The fluidic structure 102 receives the adhesive in a liquid phase. The fluidic structure 102 stores the received liquid phase adhesive 121. The fluidic structure 102 discharges the stored liquid phase adhesive 121 into the application structure 103. The fluidic structure 102 is contained within the reservoir housing 113 of the housing structure 101. The fluidic structure 102 comprises a liquid phase adhesive 121 and an adhesive reservoir 122.

The liquid phase adhesive 121 is a chemical adhesive. The liquid phase adhesive 121 is a removable adhesive. The liquid phase adhesive 121 is applied to the hair extension 104 in a liquid phase. The liquid phase adhesive 121 removably adheres the hair extension 104 to the scalp of a client.

The adhesive reservoir 122 is a reservoir. The adhesive reservoir 122 forms the containment structure that stores the liquid phase adhesive 121 in anticipation of use. The adhesive reservoir 122 is mounted in the protected space formed by the reservoir housing 113. The fluidic structure 102 draws the liquid phase adhesive 121 from the adhesive reservoir 122. The adhesive reservoir 122 comprises a lid structure 151 and a discharge structure 152.

The lid structure 151 is a disk shaped structure. The lid structure 151 encloses the superior face of the prism structure of the reservoir housing 113. The lid structure 151 encloses the hollow interior of the reservoir housing 113. The lid structure 151 is a rotating structure. The lid structure 151 rotates relative to the reservoir housing 113. The lid structure 151 provides access to the adhesive reservoir 122 contained within the reservoir housing 113. The access provided by the lid structure 151 to the adhesive reservoir 122 allows for the refilling of the liquid phase adhesive 121 contained within the adhesive reservoir 122.

The discharge structure 152 is a fluidic port. The discharge structure 152 forms the port to which the fluidic connection 132 of the application structure 103 connects. The liquid phase adhesive 121 is drawn out of the adhesive reservoir 122 by the application structure 103 through the discharge structure 152.

The application structure 103 is a mechanical structure. The application structure 103 mounts in the u-shaped slot 111 of the housing structure 101. The application structure 103 is a rotating structure. The application structure 103 forms a fluidic connection with the liquid phase adhesive 121 contained within the discharge structure 152 of the reservoir housing 113. The application structure 103 draws the liquid phase adhesive 121 into the application structure 103 from the reservoir 14 housing 113. The application structure 103 is a rotating structure. The application structure 103 applies the liquid phase adhesive 121 to the hair extension 104 as the hair extension 104 is drawn over the application structure 103 mechanism. The application structure 103 comprises a roller structure 131 and a fluidic connection 132.

The roller structure 131 is a roller. The roller is defined elsewhere in this disclosure. The roller structure 131 is a rotating structure. The hair extension 104 rolls over the roller structure 131 such that the roller structure 131 applies a coating of the liquid phase adhesive 121 directly onto the hair extension 104. The roller structure 131 draws the liquid phase adhesive 121 directly from the fluidic connection 132 between the application structure 103 and the fluidic structure 102.

The fluidic connection 132 is a fluid transport structure that fluidically connects the adhesive reservoir 122 to the roller structure 131. The fluidic connection 132 transports the liquid phase adhesive 121 from the adhesive reservoir 122 directly onto the roller structure 131.

The following definitions were used in this disclosure:

Adhere: As used in this disclosure, to adhere means to attach an object to a surface such that the object remains in a fixed position on the surface. In chemistry, the use of the term adhere often implies the action of molecular bonding or intermolecular forces between the surfaces and the object. The noun form of to adhere is adhesion.

Adhesive: As used in this disclosure, an adhesive is a chemical substance that can be used to adhere two or more objects to each other. Types of adhesives include, but are not limited to, epoxies, polyurethanes, polyimides, or cyanoacrylates, silicone, or latex based adhesives.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Exterior: As used in this disclosure, the exterior is used as a relational term that implies that an object is not contained within the boundary of a structure or a space.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Fluid Impermeable: As used in this disclosure, the term fluid impermeable refers to: a) the ability of a structure to not allow a fluid to pass through the structure; or, b) the ability of a material not absorb through the exterior surfaces of the material a fluid that the material is immersed in or exposed to.

Fluidic Connection: As used in this disclosure, a fluidic connection refers to a tubular structure that transports a fluid from a first object to a second object. Methods to design and use a fluidic connections are well-known and documented in the mechanical, chemical, and plumbing arts.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Gas: As used in this disclosure, a gas refers to a state (phase) of matter that is fluid and that fills the volume of the structure that contains it. Stated differently, the volume of a gas always equals the volume of its container.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Ground: As used in this disclosure, the ground is a solid supporting surface formed by the Earth. The term level ground means that the supporting surface formed by the ground is roughly perpendicular to the force of gravity. The term underground refers to an object being underneath the superior surface of the ground.

Hair: As used in this disclosure, hair is refers to the fibrous keratin-based structure commonly seen growing from the skin of mammals.

Hairpiece: As used in this disclosure, a hairpiece is device that is used to augment the natural hair of a person for fashion or cosmetic purposes. A hairpiece may contain either natural hair or artificial hair to make this augmentation. Toupee, wig, and hair extension are synonyms for a hairpiece.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Housing: As used in this disclosure, a housing is a rigid structure that encloses and protects one or more devices.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Liquid: As used in this disclosure, a liquid refers to a state (phase) of matter that is fluid and that maintains, for a given pressure, a fixed volume that is independent of the volume of the container.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Pedestal: As used in this disclosure, a pedestal is an intermediary load bearing structure that forms a load path between two objects or structures.

Perimeter: As used in this disclosure, a perimeter is one or more curved or straight lines that bounds an enclosed area on a plane or surface. The perimeter of a circle is commonly referred to as a circumference.

Phase: As used in this disclosure, phase refers to the state of the form of matter. The common states of matter are solid, liquid, gas, and plasma.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Removable Adhesive: As used in this disclosure, a removable adhesive is a commercially available adhesive that is designed with a lower tack, or stickiness, such that a first object is attached to a second object with a removable adhesive the first object can be readily removed in a manner that ideally, though not necessarily practically, leaves behind no adhesive residue on the second object. A repositionable adhesive is a subset of removable adhesives that are intended to allow the first object to be reattached to a third object or the second object in the initial or a different position. Within this disclosure, a removable adhesive is assumed to include repositionable adhesives. A removable adhesive is often called fugitive glue.

Reservoir: As used in this disclosure, a reservoir refers to a container or containment system that is configured to store a fluid.

Rigid Structure: As used in this disclosure, a rigid structure is a solid structure formed from an inelastic material that resists changes in shape. A rigid structure will permanently deform as it fails under a force. See bimodal flexible structure.

Roller: As used in this disclosure, a roller is revolving cylindrical device which is used to: 1) move an object; 2) press an object; 3) shape an object; 4) smooth an object; 5) crush an object; or, 6) apply a fluid to a surface.

Semi-Enclosed Prism: As used in this disclosure, a semi-enclosed prism is a prism-shaped structure wherein a portion of the lateral face of the prism-shaped is removed or otherwise replaced with a negative space. Always use negative space.

Slot: As used in this disclosure, a slot is a prism-shaped negative space formed as a groove or aperture that is formed in or through an object.

Solid: As used in this disclosure, a solid refers to a state (phase) of matter that: 1) has a fixed volume; and, 2) does not flow.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

U-Shaped Structure: As used in this disclosure, a U-shaped structure is a type of offset composite prism structure. The U-shaped structure is a three sided structure comprising a crossbeam, a first arm, and a second arm. In a U-shaped structure, the first arm and the second arm project away from the crossbeam: 1) in the same direction; 2) at a roughly perpendicular angle to the crossbeam, and, 3) the span of length of the first arm roughly equals the span of length of the second arm. An illiterate U-shaped structure refers to a U-shaped structure wherein the span of the length of the first arm differs from the span of the length of the second arm by more than 10 percent. A guided U-shaped structure refers to a U-shaped structure that has: a) the first arc formed by the interior cant formed between the first arm and the crossbeam is greater than or equal to 100 degrees; b) a second arc formed by the interior cant formed between the second arm and the crossbeam is greater than or equal to 100 degrees; and, c) the first arc and the second arc are roughly equal.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A glue-applicating apparatus comprising a housing, a fluidic member, and an application member;

wherein the housing contains the fluidic member and the application member;

wherein the glue-applicating apparatus is configured for use with a hair extension;

wherein the glue-applicating apparatus applies an adhesive to the hair extension;

wherein the application member forms a fluidic connection with the fluidic member;

wherein the fluidic connection transports the adhesive to the application member;

wherein the application member applies the adhesive to the hair extension;

wherein the fluidic member receives the adhesive in a liquid phase;

wherein the fluidic member stores the received liquid phase adhesive;

wherein the fluidic member discharges the stored liquid phase adhesive into the application member;

wherein the fluidic member is contained within a reservoir housing of the housing;

wherein the application member mounts in a u-shaped slot of the housing;

wherein the application member forms a fluidic connection with the liquid phase adhesive contained within a discharge structure of the reservoir housing;

wherein the application member draws the liquid phase adhesive into the application member from the reservoir housing;

wherein the application member applies the liquid phase adhesive to the hair extension as the hair extension is drawn over the application member.

2. The glue-applicating apparatus according to claim 1 wherein the housing comprises the u-shaped slot, a pedestal, and the reservoir housing;

wherein the u-shaped slot is a negative space that is formed in the housing;

wherein the position of the u-shaped slot is between the pedestal and the reservoir housing.

3. The glue-applicating apparatus according to claim 2 wherein the fluidic member comprises the liquid phase adhesive and an adhesive reservoir;

wherein the liquid phase adhesive is a chemical adhesive;

wherein the liquid phase adhesive is a removable adhesive;

wherein the liquid phase adhesive is applied to the hair extension in a liquid phase.

4. The glue-applicating apparatus according to claim 3 wherein the application member comprises a roller structure and the fluidic connection;

wherein the hair extension rolls over the roller structure such that the roller structure applies a coating of the liquid phase adhesive directly onto the hair extension;

wherein the roller structure draws the liquid phase adhesive directly from the fluidic connection between the application member and the fluidic member;

wherein the fluidic connection fluidically connects the adhesive reservoir to the roller structure;

wherein the fluidic connection transports the liquid phase adhesive from the adhesive reservoir directly onto the roller structure.

5. The glue-applicating apparatus according to claim 4 wherein the u-shaped slot is a disk shaped negative space;

wherein the u-shaped slot has a u-shape;

wherein the u-shaped slot is formed with three open lateral faces;

wherein the hair extension is exposed to the application member as it is drawn through the u-shaped slot.

6. The glue-applicating apparatus according to claim 5 wherein the pedestal forms an inferior structure of the housing;

wherein the pedestal is a load bearing structure;

wherein the pedestal transfers the load of the glue-applicating apparatus to a supporting surface.

7. The glue-applicating apparatus according to claim 6 wherein the reservoir housing is a hollow structure;

wherein the reservoir housing forms a superior structure of the housing;

wherein the reservoir housing forms a protected space that contains the fluidic member;

wherein the reservoir housing is a rigid structure.

8. The glue-applicating apparatus according to claim 7 wherein the adhesive reservoir is a reservoir;

wherein the adhesive reservoir forms the containment structure that stores the liquid phase adhesive;

wherein the adhesive reservoir is mounted in the protected space formed by the reservoir housing;

wherein the fluidic member draws the liquid phase adhesive from the adhesive reservoir.

9. The glue-applicating apparatus according to claim 8 wherein the adhesive reservoir comprises a lid structure and a discharge structure;

wherein the lid structure is a disk shaped structure;

wherein the lid structure encloses a superior face of the reservoir housing;

wherein the lid structure encloses a hollow interior of the reservoir housing;

wherein the lid structure provides access to the adhesive reservoir contained within the reservoir housing;

wherein the access provided by the lid structure to the adhesive reservoir allows for the refilling of the liquid phase adhesive contained within the adhesive reservoir;

wherein the discharge structure is a fluidic port;

wherein the discharge structure forms a port to which the fluidic connection of the application connects.

* * * * *